United States Patent
Kritt et al.

(10) Patent No.: US 9,380,538 B2
(45) Date of Patent: Jun. 28, 2016

(54) INTERACTIVELY COOPERATIVE MOBILE COMMUNICATION DEVICE POWER MANAGEMENT

(71) Applicant: LENOVO ENTERPRISE SOLUTIONS (SINGAPORE) PTE. LTD., New Tech Park (SG)

(72) Inventors: Barry Alan Kritt, Raleigh, NC (US); Sarbajit Kumar Rakshit, Kolkata (IN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 154 days.

(21) Appl. No.: 14/159,274

(22) Filed: Jan. 20, 2014

(65) Prior Publication Data

US 2015/0208357 A1 Jul. 23, 2015

(51) Int. Cl.
*H04W 52/02* (2009.01)

(52) U.S. Cl.
CPC ...... *H04W 52/0277* (2013.01); *H04W 52/0212* (2013.01); *H04W 52/0216* (2013.01); *Y02B 60/50* (2013.01)

(58) Field of Classification Search
CPC .............. H04W 52/0261; H04W 52/0277; H04W 52/0212; H04W 52/0216; Y02B 60/50
See application file for complete search history.

(56) References Cited

U.S. PATENT DOCUMENTS

| 8,364,154 B1 | 1/2013 | Raghunath et al. |
| 2012/0176976 A1 | 7/2012 | Wells |
| 2015/0009844 A1* | 1/2015 | Kneckt ............. H04W 52/0209 370/252 |

OTHER PUBLICATIONS

T. Martin, "Support for multiple user accounts on Android was a long time coming," Internet web page www.phonedog.com/2012/08/03/support-for-multiple-user-accounts-on-android-was-a-long-time-coming/, dated Aug. 3, 2012.

* cited by examiner

*Primary Examiner* — Nam Huynh
(74) *Attorney, Agent, or Firm* — Katherine Brown

(57) ABSTRACT

Mobile communication devices, like smartphones, cooperatively interact with one another and with a communication provider, like a cellular telephone provider, to manage power usage by the mobile devices, where the communication capabilities of the devices are still retained. For example, for two mobile devices, the first device may be placed into a reduced-power mode, while the second device remains in a non-reduced-power mode. The second device at least partially assumes the communication capability of the first device so that the communication capability of the first device is retained.

20 Claims, 3 Drawing Sheets

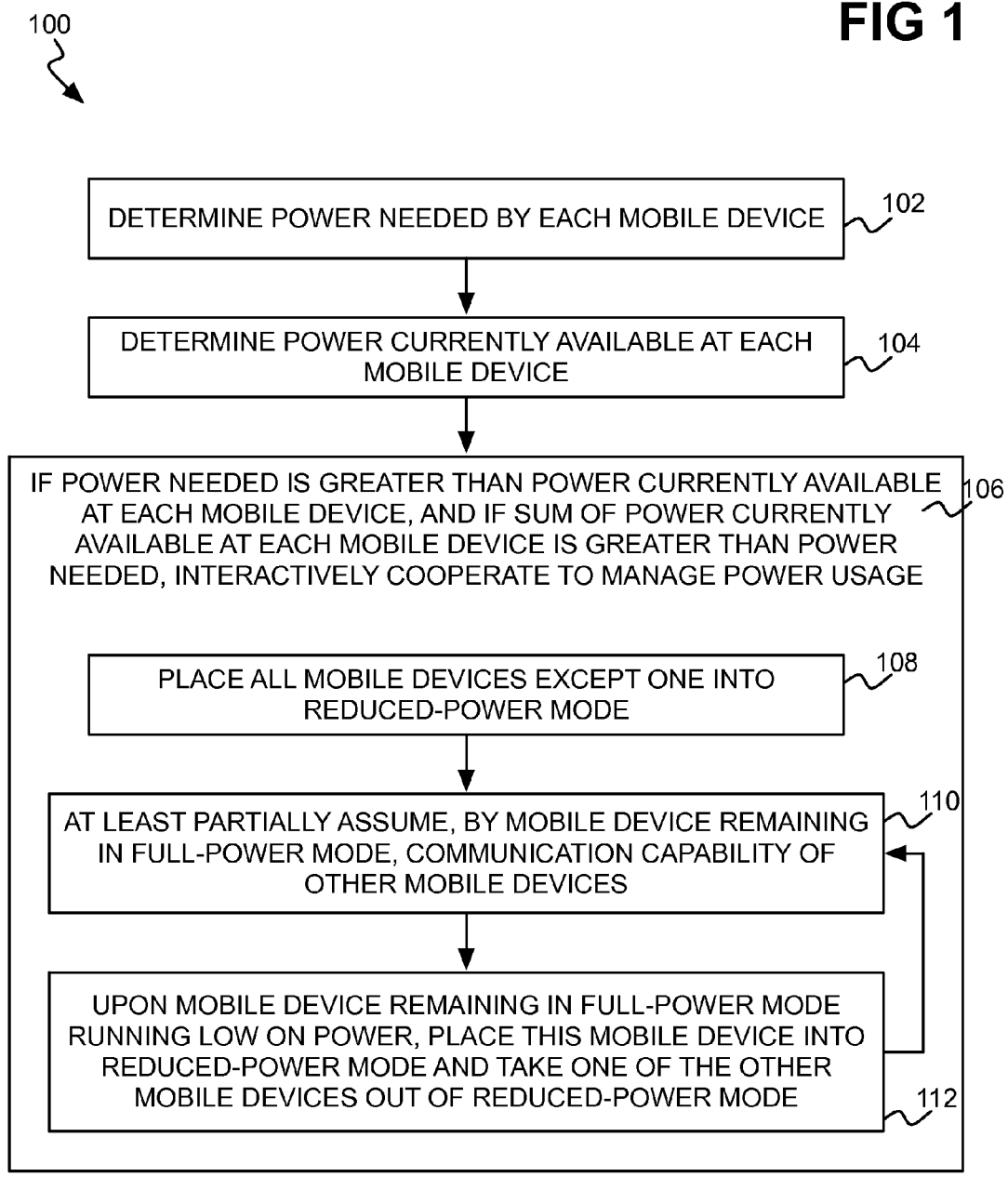

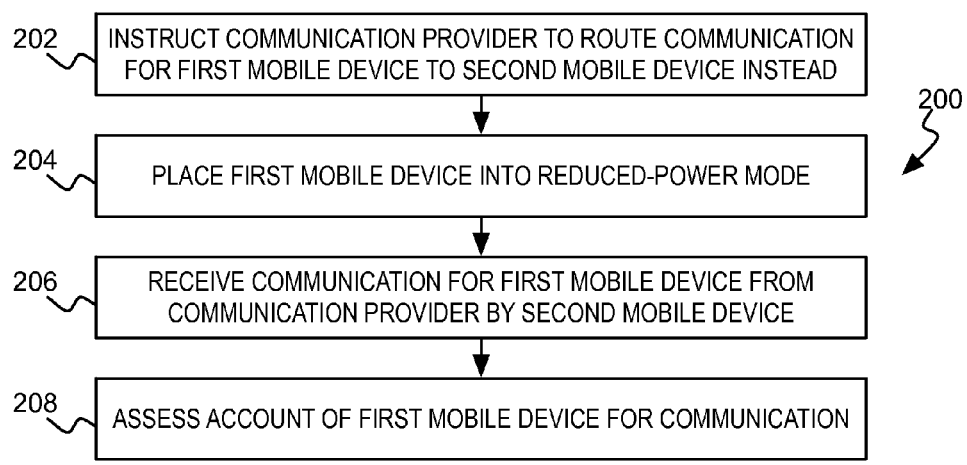
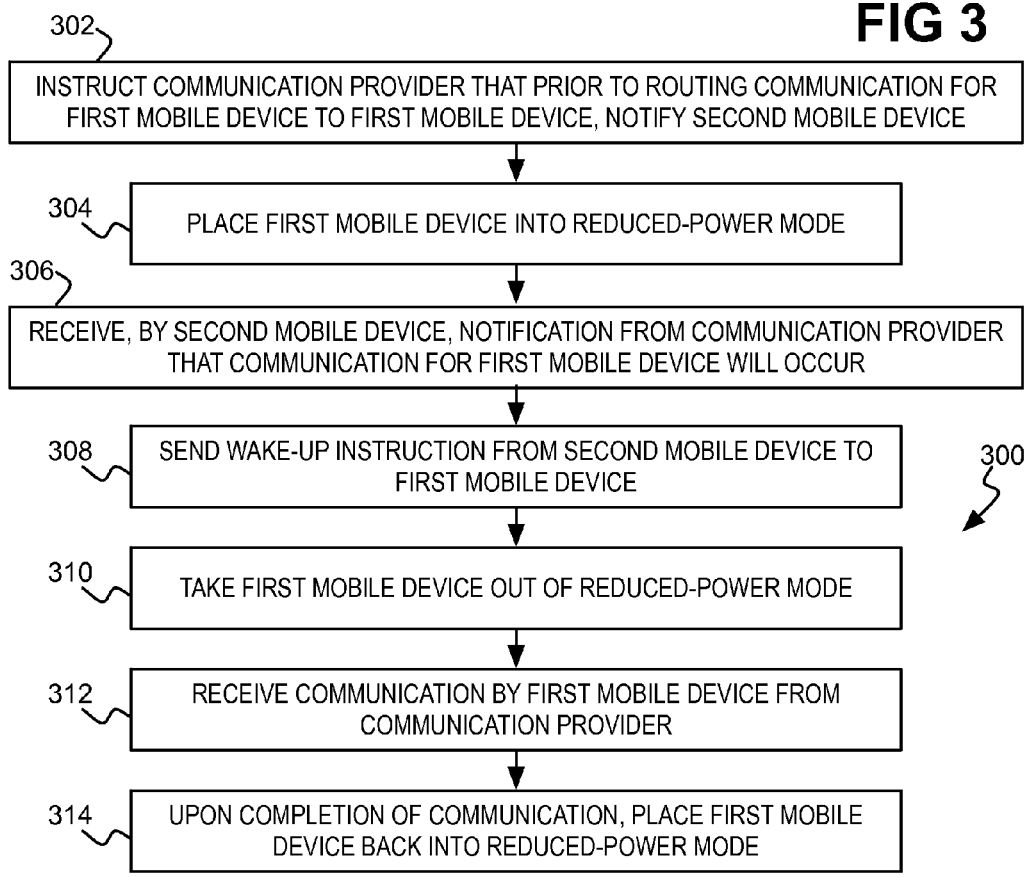

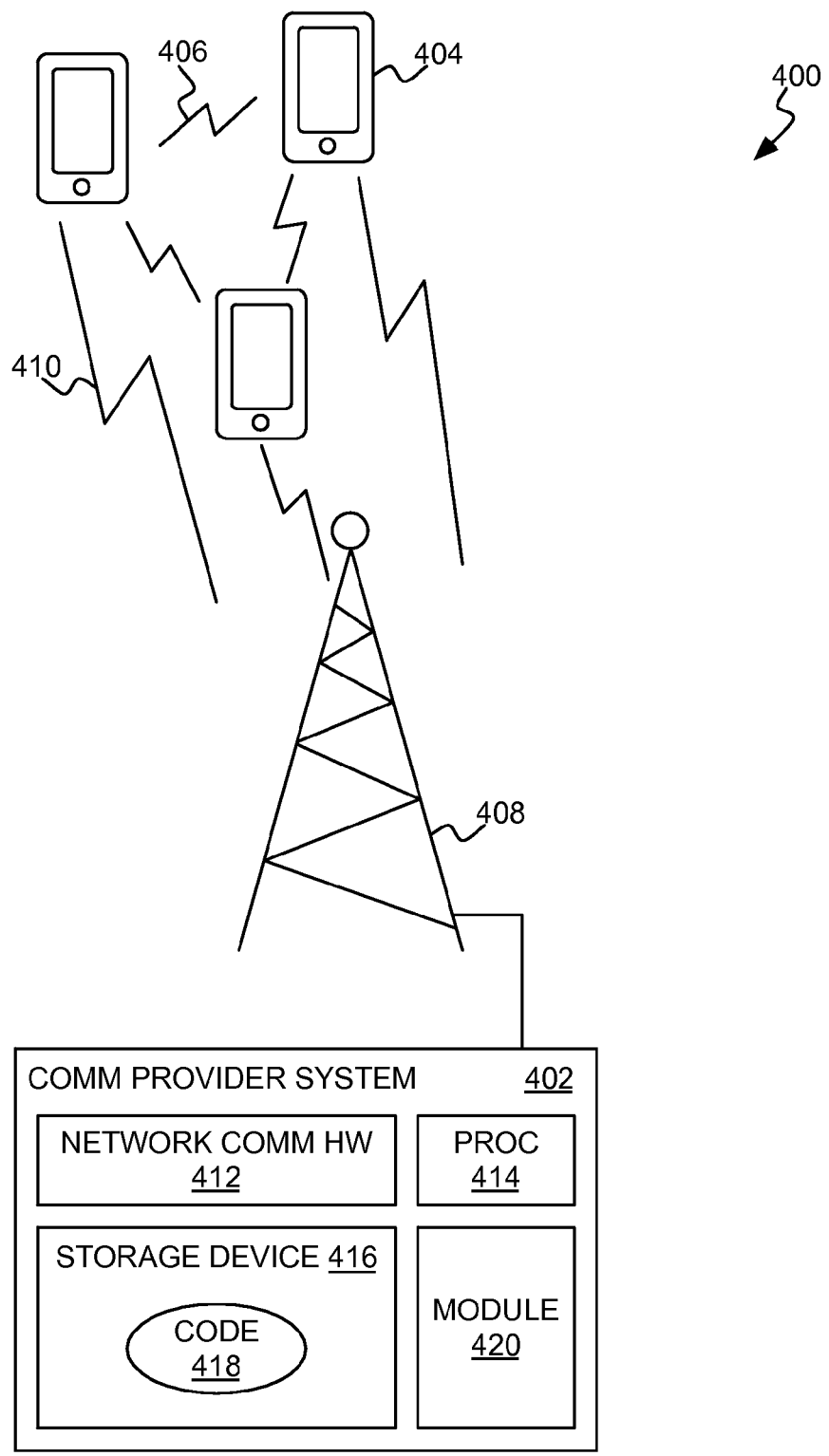

INTERACTIVELY COOPERATIVE MOBILE COMMUNICATION DEVICE POWER MANAGEMENT

BACKGROUND

Mobile communication devices, such as smartphones, have become nearly ubiquitous in modern life. Such mobile communication devices usually employ batteries for power. When the batteries are low, the mobile communication devices generally have to be plugged into a wall outlet to be recharged.

SUMMARY

An example method includes determining a required amount of power needed by each of a first mobile device and a second mobile device to remain powered for a given activity. The first mobile device and the second mobile device each have a communication capability through a communication provider. The method includes determining a first amount of power currently available at the first mobile device and a second amount of power currently available at the second mobile device. In response to the required amount of power being greater than each of the first amount of power and the second amount of power, and in response to a sum of the first amount of power and the second amount of power being greater than required amount of power, the method includes interactively cooperating, by the first mobile device, the second mobile device, and the communication provider, to manage power usage by the first mobile device and the second mobile device while retaining the communication capability of each of the first mobile device and the second mobile device.

An example computer program product includes a storage device storing computer-executable code that is executable by a first mobile device having a communication capability through a communication provider, to perform a method. The method includes cooperatively interacting with a second mobile device also having the communication capability and with the communication provider to manage power usage by the first mobile device and the second mobile device while retaining the communication capability of each of the first mobile device and the second mobile device.

An example system of a communication provider includes network communication hardware to wirelessly communicate with a first mobile device and a second mobile device using a communication capability of each of the first mobile device and the second mobile device. The example system includes a processor and a storage device storing computer-executable code executable by the processor. The example system includes a module implemented by the computer-executable code assist in managing power usage by the first mobile device and the second mobile device while retaining the communication capability of each of the first mobile device and the second mobile device.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIGS. 1, 2, and 3 are flowcharts of example methods.

FIG. 4 is a diagram of an example topological architecture.

DETAILED DESCRIPTION

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure.

As noted in the background section, mobile communication devices like smartphones usually run off batteries while they are being used. Battery technology has a general matter not kept pace with the expectations of users, such that users' mobile communication devices can at times run out of power before the users have the opportunity to recharge the devices' batteries. This can be problematic particularly for users that rely heavily on their mobile communication devices.

Techniques disclosed herein alleviate this problem by permitting multiple mobile communication devices and their communication provider, such as a cellular telephone provider, to interactively cooperate to manage the power used by all the mobile devices. In general, one of the mobile communication devices can at least partially assume the communication capabilities of the other mobile communication devices while the other mobile devices are placed into a reduced-power mode to conserve power. When the battery of the former mobile communication device runs down, this mobile device may be placed into the reduced-power mode and a different mobile communication device taken out of the reduced-power mode and assume the communication capabilities of the other mobile devices.

As such, in effect the mobile communication devices share their available battery power to ensure that their communication capabilities are retained for a greater length of time. Most of the time, just one of the mobile devices is in a non-reduced-power mode. However, the other mobile devices that are in the reduced-power mode still retain their communication capabilities with the communication provider, because of the interactive cooperation among the mobile devices and the communication provider to permit the device that is in the non-reduced-power mode to at least partially assume the communication capabilities of the devices in the reduced-power mode.

FIG. 1 shows an example method 100 in this respect of an overview of the general process in one specific implementation. The method 100 is performed in relation to multiple mobile communication devices, such as smartphones, in conjunction with a communication provider, such as a cellular or other type of mobile telephone carrier. The mobile communication devices are said to each have a communication capability through the communication provider. For instance, they may each be able to place and receive phone calls via the communication provider.

The amount of power required by each mobile device to remain powered for a given activity is determined (102). The activity may be a long car or bus ride in which device recharging ability is limited or nonexistent, a lengthy trade show or other type of conference in which device recharging opportunity is likewise limited or nonexistent, and so on. A user of a mobile device may determine that the device has to remain powered for a length of time, input regarding which the mobile device can then use to determine how much power the device requires to remain powered for the activity in question.

Different users may use their devices in different ways. Some users may make more phone calls than other users, for example. As such, even for the same type of device, devices of different users may require different amounts of power for the same activity. A mobile device may determine how much power is required for its user based on historical usage patterns of the user, based on different profiles from which the user selects how the device is expected to be used, and so on. As an example of the latter, a user may be able to specify a heavy, medium, or light usage profile for the duration of time in which the given activity is expected to last.

The mobile devices are within a same proximate area to one another. For example, the mobile devices may all be located within the same car, bus, or other vehicle in which their users are traveling. As another example, the mobile devices may all be located within the same venue at which their users are attending a trade show, convention, conference, or other type of meeting. As such, the mobile devices are able to share the information as to their individual required amounts of power, and the power needed by each mobile device deemed as being equal to the greatest amount of power required by any individual device. That is, if devices D1, D2, . . . , DN individually require power p1, p2, . . . , pN, respectively, then the power p (such as in watts) needed by each mobile device in part 102 can be deemed in one implementation as being equal to max(p1, p2, . . . , pN).

The power currently available at each mobile device is also determined (104). Some mobile devices may be fully charged, and other mobile devices may not. Some mobile devices may have larger battery capacities than other mobile devices do. The power currently available at each mobile device is also able to be shared among the mobile devices. For both parts 102 and 104, a given mobile device may be selected a priori or in another manner as being the leader responsible for collecting the information in question from the other mobile devices in this respect, or each mobile device may perform such collection itself by listening for the information being sent from the other mobile devices. The power currently available at the devices D1, D2, . . . , DN may be P1, P2, . . . , PN respectively, where a total amount of power currently available at the devices P is equal to P1+P2+ . . . +PN.

The mobile devices interactively cooperative with one another and with the communication provider to manage their power usage if the power needed by each mobile device is greater than the power currently available at each mobile device, and if the total amount of power currently available at all the devices is greater than the power needed by each mobile device (106). That is, interactive cooperation is performed for power managed if p>Pk for every k=1 . . . N, and if P>p. The interactive cooperation is performed among the mobile devices and the communication provider to retain the communication capability of each mobile device, such as the capability of each mobile device to effectively make and receive phone calls.

Different examples as to how this interactive cooperation is achieved are described in detail later in the detailed description. However, as a general approach, in one implementation, all the mobile devices except for one are placed into a reduced-power mode (108). In the reduced-power mode, a mobile device is unable to communicate with the communication provider to make and receive phone calls. For example, the radio in the mobile device by which the device communicates with a communication tower of the communication provider may be turned off. In the reduced-power mode, however, a mobile device may still be able to communicate with the other mobile devices that are located nearby, such as via a Bluetooth low energy (BLE) communication capability thereof.

The leader that collected the information from the other mobile devices in parts 102 and 104 may direct which mobile device is to remain in non-reduced-power mode (i.e., full-power mode) and direct the other mobile devices to enter the reduced-power mode. Alternatively, where all the mobile devices collected the information in parts 102 and 104, the mobile devices may each decide whether it is to remain in full-power mode or enter into reduced-power mode in accordance with a predetermined understanding among the mobile devices. For example, it may be predetermined that at first the mobile device having the greatest amount of power currently available remains in full-power mode, and that the other mobile devices enter reduced-power mode.

The mobile device that remains in full-power mode at least partially assumes the communication capabilities of the other mobile devices (110), so that it can be said that the communication capability of each other mobile device is retained. Different specific examples of how such assumption occurs are described later in the detailed description. The communication capability in question can be that which requires full-power mode to perform, such as receiving and making phone calls with the communication provider via communication with the communication tower thereof.

At some point, the mobile device that is in the full-power mode will run low on power, at which time this mobile device is placed into reduced-power mode and one of the other mobile devices is taken out of the reduced-power mode (112), and the method 100 is repeated at part 110 in relation to the mobile device that most recently exited the reduced-power mode. For example, where the mobile devices know how much power is currently available at each mobile device in part 104, the mobile device that is to enter the reduced-power mode in part 112 may first inform the mobile device having the next greatest amount of power currently available to exit the reduced-power mode and take its place. As noted above, even in the reduced-power mode, the mobile devices may be able to communicate with one another, using a communication capability like BLE that requires significantly less power than the communication capability by which communication is achieved with the communication provider itself.

The mobile devices that participate in the power management process of the method 100 may have previously authorized their acquiescence to have their power managed in this way. For example, the user of each mobile device may have selected the other mobile devices with which it is willing to enter into the power management process. The method 100 in one implementation presumes that the mobile devices are sufficiently local to one another at least to the extent that the mobile devices can communicate with one another in the reduced-power mode. If a given mobile device becomes sufficiently remote that it can no longer communicate with the other mobile devices, then the given device may leave the power management process that is ongoing. The other devices may restart the method 100 again at least at part 104, or may otherwise continue the method 100 without the mobile device that is no longer in local communication.

The method 100 has further been described such that the mobile devices can communicate with one another. However, the method 100 can be performed in other ways as well. For instance, at least one of the mobile devices may run a computer program, such as an app, that indicates the order in which the mobile devices should be the sole device that is in full-power mode, and at what times the various devices should exit the full-power mode or the reduced-power mode.

The user of this device may then instruct the users of the other devices accordingly. Other approaches are also possible by which inter-mobile device communication in the reduced-power mode is unnecessary.

As another example, each mobile device may run an app to determine the power needed thereby in part 102 and the power currently available in part 104, and notify its user. The users of the mobile devices may then themselves determine the order in which the mobile devices are to enter and exit the full-power mode and the reduce power-mode in parts 108 and 112, and the user of the mobile device remaining in the full-power mode may notify the communication provider via the same or a different app that it is at least partially assuming the communication capability of the other mobiles devices. As such, in general the method 100 does not require that the mobile devices be able to communicate with one another in the reduced-power mode to be performed.

FIGS. 2 and 3 show example methods 200 and 300, respectively, of two different approaches by which mobile communication devices interactively communicate with one another and with a communication provider to manage power usage by the mobile devices while still retaining their communication capabilities with the provider are now presented. The approaches are described in relation to a first mobile device and a second mobile device, but can be generalized in relation to more than two devices as well. Furthermore, the approaches are explicitly described in relation to the first mobile device entering a reduced-power mode and the second mobile device remaining in a non-reduced-power mode (i.e., a full-power mode), but the two mobile devices can switch places as to which modes they enter as well, at different times. The approaches, in other words, are described in specific relation to the first mobile device at least partially assuming the communication capability of the second mobile device, but the second mobile device can in a like manner at least partially assume the communication of the first mobile device.

It is noted that the methods 200 and 300 can be performed separately from the method 100 that has been described. That is, the methods 200 and 300 can be performed where users want to manage the power usage of the mobile communication devices, even in contexts where the method 100 cannot be or is not being performed. For instance, users may be unable to accurately anticipate future power demands on their mobile communication devices, but still want to manage the power usage thereof.

In each of the methods 200 and 300, the mobile communication devices can have corresponding identifiers by which they are uniquely identified with the communication provider. For example, in the context of smartphones and similar such devices, these identifiers may be mobile station identification numbers (MSINs) derived from telephone numbers assigned to the devices via the communication provider. Each mobile device has a communication capability by which it is able to communicate with the communication provider. This communication capability is available in the full-power mode, but is unavailable in the reduced-power mode.

In the method 200, the communication provider is instructed to route communication for the identifier of the first mobile device to the second mobile device instead (202), and the first mobile device is placed into the reduced-power mode (204). For example, the first mobile device may perform the instruction in part 202 before entering the reduced-power mode in part 204, or the second mobile device may perform the instruction in part 202. When there is a communication for the identifier of the first mobile device, the second mobile device thus receives the communication from the communication provider instead of the first mobile device receiving this communication (206). As an example, a phone call made to the first mobile device is in fact received by the second mobile device for the first mobile device.

However, the account of the first mobile device with the communication provider is charged for this communication, even though the communication was received by the second mobile device and not by the first mobile device (208). For example, if a user of the first mobile device is permitted to make a predetermined number of minutes of phone calls each month, the phone call for the identifier of the first mobile device that is received by the second mobile device in part 206 is charged against these minutes. As such, the user of the second mobile device is not penalized in this way for receiving a phone call on behalf of the first mobile device's identifier.

The method 200 does not require that the mobile communication devices are able to communicate with one another. By comparison, in the method 300, each mobile device, in addition to the communication capability that permits it to communicate with the communication provider, has a low-power communication capability to communicate with the other mobile device (and not with the communication provider). The low-power communication capability is thus different than the communication capability that permits a mobile device to communicate with the communication provider, and requires significantly less power to perform its communication. The low-power communication capability is a reduced-range capability, however, at least as compared to the communication capability for communication with the communication provider. The low-power communication capability may be a BLE communication capability, for instance.

In the method 300, the communication provider is instructed that prior to routing communication for the identifier of the first mobile device to the first mobile device, the communication provider is to notify the second mobile device that this communication will be occurring (302), and the first mobile device is placed into the reduced-power mode (304). For example, the first mobile device may perform the instruction in part 302 before entering the reduced-power mode in part 304, or the second mobile device may perform the instruction in part 302. It is noted that even though the first mobile device has entered the reduced-power mode, the lower-power communication capability thereof by which the first device communicates with the second mobile device remains available, in contradistinction to the communication capability by which the first mobile device communicates with the communication provider.

As such, when there is a communication for the identifier of the first mobile device, the second mobile device first receives a notification from the communication provider that this communication will occur (306). The second mobile device responsively sends a wake-up instruction to the first mobile device via the low-power communication capability (308), and in response to receiving the wake-up instruction, the first mobile device is taken out of the reduced-power mode (310). For instance, the first mobile device exits the reduced-power mode and enters the full-power mode in which it has the communication capability available to communicate with the communication provider. The first mobile device may confirm that it has exited the reduced-power mode, to the second mobile device or to the communication provider. The second mobile device may forward this confirmation to the communication provider in the latter scenario, or may confirm to the communication provider that it has sent the wake-up instruction to the first mobile device.

The first mobile device thus receives the communication for its identifier from the communication provider, via the communication capability (312). Once this communication has been completed, the first mobile device is placed back into the reduced-power mode (314). For instance, the first mobile device exits the full-power mode and reenters the reduced-power mode where it again is unable to communicate with the communication provider but uses little if any power in such a standby mode.

To appreciate the difference between the methods 200 and 300 that have been described, consider the scenario in which the first mobile device has entered the reduced-power mode, and there is a phone call for this device's identifier. In the method 200, the phone call is instead sent to the second mobile device, and presumably the user of the first mobile device will borrow the second mobile device to answer the phone call, even though this user's account with the communication provider is assessed for the account. The first mobile device remains in the reduced-power mode for the duration, and does not exit this mode for the phone call.

By comparison, in the method 300, the second mobile device receives notification from the communication provider that the first mobile device will be receiving a phone call, and sends a wake-up instruction to the first mobile device. The first mobile device correspondingly exits the reduced-power mode, and the communication provider routes the phone call to the first mobile device, such that the user answers the call. Thereafter, the first mobile device can reenter the reduced-power mode. It is also noted for each of the methods 100, 200, and 300 that have been described, the portions performed by each mobile communication device may occur by execution of a processor thereof from a non-volatile storage medium thereof, such as flash semiconductor memory.

FIG. 4 shows an example topological architecture 400 in relation to which the methods 100, 200, and 300 can be implemented or otherwise performed. The architecture includes a communication provider system 402 and multiple mobile communication devices 404. The mobile devices 404 are located locally to one another, and may be able to communicate with one another via a low-power communication capability, as indicated by lightning bolts 406. By comparison, the system 402 of the communication provider communicates with the mobile devices 404 using a different, higher-power communication capability, which may involve the system 402 being connected, typically in a wired manner, to a radio tower 408 with which the mobile devices 404 wirelessly communicate, as indicated by lightning bolts 410.

The communication provider system 402 may be implemented as one or more computing devices, such as server computing devices. The system 402 includes at least network communication hardware 412, a processor 414, a storage device 416 storing computer-executable code 418, and a module 420. The network communication hardware 412 permits the system 402 to wirelessly communicate with the mobile communication devices 404, via the aforementioned communication capability, such as in utilization of the radio tower 408.

The computer-executable code 418 is executable by the processor 414 to implement the module 420. The module 420 assists in managing power usage by the mobile communication devices 404, while retaining the communication capabilities thereof, as has been described. That is, the module 420 performs those aspects of the methods 100, 200, and 300 that have been ascribed to the communication provider. In that way, then, the communication provider interactively cooperates with the mobile devices 404 to manage power usage thereby.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method comprising:
    determining a required amount of power needed by each of a first mobile device and a second mobile device to remain powered for a given activity, the first mobile device and the second mobile device each having a communication capability through a communication provider;
    determining a first amount of power currently available at the first mobile device and a second amount of power currently available at the second mobile device; and
    in response to the required amount of power being greater than each of the first amount of power and the second amount of power, and in response to a sum of the first amount of power and the second amount of power being greater than the required amount of power,
        interactively cooperating, by the first mobile device, the second mobile device, and the communication provider, to manage power usage by the first mobile device and the second mobile device while retaining the communication capability of each of the first mobile device and the second mobile device.

2. The method of claim 1, wherein interactively cooperating to manage the power usage by the first mobile device and the second mobile device while retaining the communication capability of each of the first mobile device and the second mobile device comprises:
    at least partially assuming, by the second mobile device, the communication capability of the first mobile device so that the second mobile device interacts with the communication carrier on behalf of the first mobile device; and
    placing the first mobile device into a reduced-power mode such that the communication capability of the first mobile device is unavailable at the first mobile device, while the second mobile device remains in a non-reduced-power mode such that the communication capability of the second mobile device is available at the second mobile device.

3. The method of claim 2, wherein interactively cooperating to manage the power usage by the first mobile device and the second mobile device while retaining the communication capability of each of the first mobile device and the second mobile device comprises:
    taking the first mobile device out of the reduced-power mode and placing the first mobile device into the non-reduced-power mode such that the communication capability of the first mobile device is again available at the first mobile device;
    at least partially assuming, by the first mobile device, the communication capability of the second mobile device so that the first mobile device interacts with the communication carrier on behalf of the second mobile device; and
    placing the second mobile device into the reduced-power mode such that the communication capability of the second mobile device is unavailable at the second mobile device.

4. The method of claim 1, wherein the first mobile device has a first identifier by which the communication provider communicates with the first mobile device, and the second mobile device has a second identifier by which the communication provider communicates with the second mobile device,
    and wherein interactively cooperating to manage the power usage by the first mobile device and the second mobile device while retaining the communication capability of each of the first mobile device and the second mobile device comprises:
        instructing the communication provider to route communication for the first identifier to the second mobile device instead of to the first mobile device; and placing the first mobile device into a reduced-power mode such that the communication capability of the first mobile device is unavailable at the first mobile device.

5. The method of claim 4, wherein interactively cooperating to manage the power usage by the first mobile device and the second mobile device while retaining the communication capability of each of the first mobile device and the second mobile device further comprises:
receiving the communication for the first identifier by the second mobile device from the communication provider, instead of by the first mobile device; and
assessing an account of the first mobile device for the communication for the first identifier, even though the communication was received by the second mobile device and not by the first mobile device.

6. The method of claim 4, wherein the first identifier of the first mobile device is a first mobile station identification number (MSIN) derived from a first telephone number assigned to the first mobile device via the communication provider, and the second identifier of the second mobile device is a second MSIN derived from a second telephone number assigned to the second mobile device via the communication provider.

7. The method of claim 1, wherein the first mobile device has a first identifier by which the communication provider communicates with the first mobile device, the second mobile device has a second identifier by which the communication provider communicates with the second mobile device, and each of the first mobile device and the second mobile device has a reduced-range, low-power communication capability to interact with one another and not with the communication provider and that is different than the communication capability thereof,
and wherein interactively cooperating to manage the power usage by the first mobile device and the second mobile device while retaining the communication capability of each of the first mobile device and the second mobile device comprises:
instructing the communication provider that prior to routing communication for the first identifier to the first mobile device, the communication provider is to notify the second mobile device of the communication; and
placing the first mobile device into a reduced-power mode such that the communication capability of the first mobile device is unavailable at the first mobile device but such that the reduced-range, low-power communication capability of the first mobile device remains available at the first mobile device.

8. The method of claim 7, wherein interactively cooperating to manage the power usage by the first mobile device and the second mobile device while retaining the communication capability of each of the first mobile device and the second mobile device further comprises:
receiving, by the second mobile device, a notification from the communication provider that the communication for the first identifier will occur;
sending, from the second mobile device to the first mobile device, a wake-up instruction via the reduced-range, low-power communication capability of each of the first mobile device and the second mobile device;
in response to the wake-up instruction, taking the first mobile device out of the reduced-power mode and placing the first mobile device into a non-reduced-power mode such that the communication capability of the first mobile device is again available at the first mobile device; and receiving, by the first mobile device, the communication for the first identifier via the communication capability.

9. The method of claim 8, wherein interactively cooperating to manage the power usage by the first mobile device and the second mobile device while retaining the communication capability of each of the first mobile device and the second mobile device further comprises:
after the communication for the first identifier has been completed, placing the first mobile device back into the reduced-power mode such that the communication capability of the first mobile device is unavailable at the first mobile device but such that the reduced-range, low-power communication capability of the first mobile device remains available at the first mobile device.

10. The method of claim 7, wherein the reduced-range, low-power communication capability of each the first mobile device and the second mobile device is a Bluetooth low energy (BLE) communication capability of each the first mobile device and the second mobile device.

11. A non-transitory computer-readable medium
storing computer-executable code that is executable by a first mobile device having a communication capability through a communication provider, to perform a method comprising:
determining a first required amount of power needed by the first mobile device to remain powered for a given activity;
determining a first amount of power currently available at the first mobile device;
sending the first required amount of power and the first amount of power currently available to a second mobile device also having the communication capability;
receiving a second required amount of power needed by the second mobile device to remain powered for the given activity, and a second amount of power currently available at the second mobile device;
in response to a maximum of the first required amount of power and the second required amount of power being greater than each of the first amount of power currently available and the second amount of power currently available, and in response to a sum of the first amount of power currently available and the second amount of power currently available being greater than the maximum of the first required amount of power and the second required amount of power,
cooperatively interacting with the second mobile device and with the communication provider to manage power usage by the first mobile device and the second mobile device while retaining the communication capability of each of the first mobile device and the second mobile device.

12. The non-transitory computer-readable medium of claim 11, wherein the first mobile device has a first identifier by which the communication provider communicates with the first mobile device, and the second mobile device has a second identifier by which the communication provider communicates with the second mobile device,
wherein cooperatively interacting with the second mobile device and with the communication provider comprises:
instructing the communication provider to route communication for the first identifier to the second mobile device instead of to the first mobile device; and
entering a reduced-power mode such that the communication capability of the first mobile device is unavailable at the first mobile device,
and wherein an account of the first mobile device is assessed for the communication for the first identifier routed to the second mobile device, even though the communication was routed to the second mobile device and not to the first mobile device.

13. The non-transitory computer-readable medium of claim 11, wherein the first mobile device has a first identifier by which the communication provider communicates with the first mobile device, and the second mobile device has a second identifier by which the communication provider communicates with the second mobile device,
  wherein the communication provider is instructed to route communication for the second identifier to the first mobile device instead of to the second mobile device, and the second mobile device enters a reduced-power mode such that the communication capability of the second mobile device is unavailable at the second mobile device,
  wherein cooperatively interacting with the second mobile device and with the communication provider comprises:
    receiving the communication for the second identifier by the first mobile device from the communication provider, instead of by the second mobile device,
  and wherein an account of the second mobile device is assessed for the communication for the second identifier routed to the first mobile device, even though the communication was routed to the first mobile device and to the second mobile device.

14. The non-transitory computer-readable medium of claim 11, wherein the first mobile device has a first identifier by which the communication provider communicates with the first mobile device, the second mobile device has a second identifier by which the communication provider communicates with the second mobile device, and each of the first mobile device and the second mobile device has a reduced-range, low-power communication capability to interact with one another and not with the communication provider and that is different than the communication capability thereof,
  and wherein cooperatively interacting with the second mobile device and with the communication provider comprises:
    instructing the communication provider that prior to routing communication for the first identifier to the first mobile device, the communication provider is to notify the second mobile device of the communication; and
    entering a reduced-power mode such that the communication capability of the first mobile device is unavailable at the first mobile device but such that the reduced-range, lower-power communication capability of the first mobile device remains available at the first mobile device.

15. The non-transitory computer-readable medium of claim 14, wherein cooperatively interacting with the second mobile device and with the communication provider further comprises:
  receiving, from the second mobile device, a wake-up instruction via the reduced-range, low-power communication capability of the first mobile device, the second mobile device having sent the wake-up instruction responsive to receiving a notification from the communication provider that the communication for the first identifier will occur;
  exiting the reduced-power mode and entering a non-reduced-power mode such that the communication capability of the first mobile device is again available at the first module device; and
  receiving the communication for the first identifier via the communication capability.

16. The non-transitory computer-readable medium of claim 15, wherein cooperatively interacting with the second mobile device and with the communication provider further comprises:
  after the communication for the first identifier has been completed, entering the reduced-power mode again such that the communication capability of the first mobile device is unavailable at the first mobile device but such that the reduced-range, low-power communication capability of the first mobile device remains available at the first mobile device.

17. The non-transitory computer-readable medium of claim 11, wherein the first mobile device has a first identifier by which the communication provider communicates with the first mobile device, the second mobile device has a second identifier by which the communication provider communicates with the second mobile device, and each of the first mobile device and the second mobile device has a reduced-range, low-power communication capability to interact with one another and not with the communication provider and that is different than the communication capability thereof,
  wherein the communication provider is instructed that prior to routing communication for the second identifier to the second mobile device, the communication provider is to notify the first mobile device of the communication,
  wherein the second mobile device enters a reduced-power mode such that the communication capability of the second mobile device is unavailable at the second mobile device but such that the reduced-range, low-power communication capability of the second mobile device remains available at the second mobile device,
  and wherein cooperatively interacting with the second mobile device and with the communication provider comprises:
    receiving a notification from the communication provider that the communication for the second identifier will occur; and
    sending, to the second mobile device, a wake-up instruction via the reduced-range, low-power communication capability of the first mobile device, to instruct the second mobile device is exit the reduced-power mode and enter a non-reduced-power mode such that the communication capability of the second mobile device is again available at the second mobile device so that the second mobile device is able of receiving the communication for the second identifier via the communication capability.

18. A mobile device comprising:
  hardware to provide the mobile device with a communication capability through a communication provider;
  a processing unit;
  a storage device storing computer-executable code executable by the processing unit to:
    determine a first required amount of power needed by the mobile device to remain powered for a given activity;
    determine a first amount of power currently available at the mobile device; sending the first required amount of power and the first amount of power currently available to a second mobile device also having the communication capability;
    receive a second required amount of power needed by the second mobile device to remain powered for the given activity, and a second amount of power currently available at the second mobile device;

in response to a maximum of the first required amount of power and the second required amount of power being greater than each of the first amount of power currently available and the second amount of power currently available, and in response to a sum of the first amount of power currently available and the second amount of power currently available being greater than the maximum of the first required amount of power and the second required amount of power,
cooperatively interact with the second mobile device and with the communication provider to manage power usage by the mobile device and the second mobile device while retaining the communication capability of each of the mobile device and the second mobile device.

19. The mobile device of claim 18, wherein the mobile device has a first identifier by which the communication provider communicates with the mobile device, the second mobile device has a second identifier by which the communication provider communicates with the second mobile device, and each of the mobile device and the second mobile device has a reduced-range, low-power communication capability to interact with one another and not with the communication provider and that is different than the communication capability thereof,
and wherein the processing unit is to execute the computer-executable code to cooperatively interact with the second mobile device and with the communication provider by:
instructing the communication provider that prior to routing communication for the first identifier to the mobile device, the communication provider is to notify the second mobile device of the communication; and
entering a reduced-power mode such that the communication capability of the mobile device is unavailable at the mobile device but such that the reduced-range, lower-power communication capability of the mobile device remains available at the mobile device.

20. The mobile device of claim 18, wherein the mobile device has a first identifier by which the communication provider communicates with the mobile device, the second mobile device has a second identifier by which the communication provider communicates with the second mobile device, and each of the mobile device and the second mobile device has a reduced-range, low-power communication capability to interact with one another and not with the communication provider and that is different than the communication capability thereof,
wherein the communication provider is instructed that prior to routing communication for the second identifier to the second mobile device, the communication provider is to notify the mobile device of the communication,
wherein the second mobile device enters a reduced-power mode such that the communication capability of the second mobile device is unavailable at the second mobile device but such that the reduced-range, low-power communication capability of the second mobile device remains available at the second mobile device,
and wherein the processing unit is to execute the computer-executable code to cooperatively interact with the second mobile device and with the communication provider by:
receiving a notification from the communication provider that the communication for the second identifier will occur; and
sending, to the second mobile device, a wake-up instruction via the reduced-range, low-power communication capability of the mobile device, to instruct the second mobile device is exit the reduced-power mode and enter a non-reduced-power mode such that the communication capability of the second mobile device is again available at the second mobile device so that the second mobile device is able of receiving the communication for the second identifier via the communication capability.

* * * * *